(12) United States Patent
Doglioni Majer et al.

(10) Patent No.: US 10,869,571 B2
(45) Date of Patent: Dec. 22, 2020

(54) APPARATUS TO PREPARE BEVERAGES

(71) Applicant: RHEAVENDORS SERVICES S.p.A, Como (IT)

(72) Inventors: Carlo Doglioni Majer, Como (IT); Ezio Ceriani, Como (IT); Luca Doglioni Majer, Como (IT); Aldo Doglioni Majer, Como (IT)

(73) Assignee: RHEAVENDORS SERVICES S.p.A, Como (IT)

( * ) Notice: Subject to any disclaimer, the term of this patent is extended or adjusted under 35 U.S.C. 154(b) by 222 days.

(21) Appl. No.: 14/908,675

(22) PCT Filed: Jul. 25, 2014

(86) PCT No.: PCT/IB2014/001393
§ 371 (c)(1),
(2) Date: Jan. 29, 2016

(87) PCT Pub. No.: WO2015/015270
PCT Pub. Date: Feb. 5, 2015

(65) Prior Publication Data
US 2016/0157665 A1 Jun. 9, 2016

(30) Foreign Application Priority Data

Jul. 31, 2013 (EP) .................................... 13178837

(51) Int. Cl.
*A47J 31/36* (2006.01)
*A23F 5/26* (2006.01)
(Continued)

(52) U.S. Cl.
CPC .......... *A47J 31/3676* (2013.01); *A23F 5/262* (2013.01); *A47J 31/3614* (2013.01);
(Continued)

(58) Field of Classification Search
CPC ................ A47J 31/3614; A47J 31/3619; A47J 31/3671; A47J 31/3676; A47J 31/40;
(Continued)

(56) References Cited

U.S. PATENT DOCUMENTS 4,852,472 A    8/1989 In-Albon et al.
5,302,407 A *  4/1994 Vetterli .................. A47J 31/46
                                              426/433
(Continued)

FOREIGN PATENT DOCUMENTS

EP    0 299 399 A2    1/1989
EP    0 528 757 A1    2/1993
(Continued)

OTHER PUBLICATIONS

International Preliminary Report on Patentability dated Feb. 11, 2016 from the International Bureau in counterpart International Application No. PCT/IB2014/001393.
(Continued)

*Primary Examiner* — Justin C Dodson
(74) *Attorney, Agent, or Firm* — Sughrue Mion, PLLC

(57) ABSTRACT

An apparatus to prepare beverages comprises a brewing chamber 3 movable by driving means 5, 6 along a vertical path, a first piston 7 and a second piston 9 movable within the brewing chamber 3, a hopper 25 to feed coffee powder to the brewing chamber and a discharge device 21 to discharge a spent coffee cake; the hopper 25 is pivotally mounted in the apparatus to obtain a desired distribution of coffee powder in the chamber.

14 Claims, 13 Drawing Sheets

(51) Int. Cl.
*A47J 31/40* (2006.01)
*A47J 31/42* (2006.01)

(52) U.S. Cl.
CPC ......... *A47J 31/3619* (2013.01); *A47J 31/404* (2013.01); *A47J 31/42* (2013.01)

(58) Field of Classification Search
CPC ...... A47J 31/401; A47J 31/404; A47J 31/405; A23F 5/262
USPC ..... 99/275, 279, 289, 295, 297, 300, 302 R, 99/302 P
See application file for complete search history.

(56) References Cited

U.S. PATENT DOCUMENTS

| | | | |
|---|---|---|---|
| 5,316,781 A | 5/1994 | Lussi et al. | |
| 5,406,882 A * | 4/1995 | Shaanan | A47J 31/18 99/287 |
| 5,526,733 A | 6/1996 | Klawuhn et al. | |
| 2009/0223374 A1 * | 9/2009 | Morin | A47J 31/3619 99/287 |
| 2010/0236418 A1 * | 9/2010 | Sampaoli | A47J 31/3614 99/287 |
| 2011/0011272 A1 * | 1/2011 | Lussi | A47J 31/3609 99/289 R |

FOREIGN PATENT DOCUMENTS

| | | |
|---|---|---|
| GB | 2 019 202 A | 10/1979 |
| WO | 93/20736 A1 | 10/1993 |

OTHER PUBLICATIONS

International Search Report for PCT/IB2014/001393 dated Dec. 15, 2014.
European Search Report for EP 13 17 8837 dated Jan. 21, 2014.

\* cited by examiner

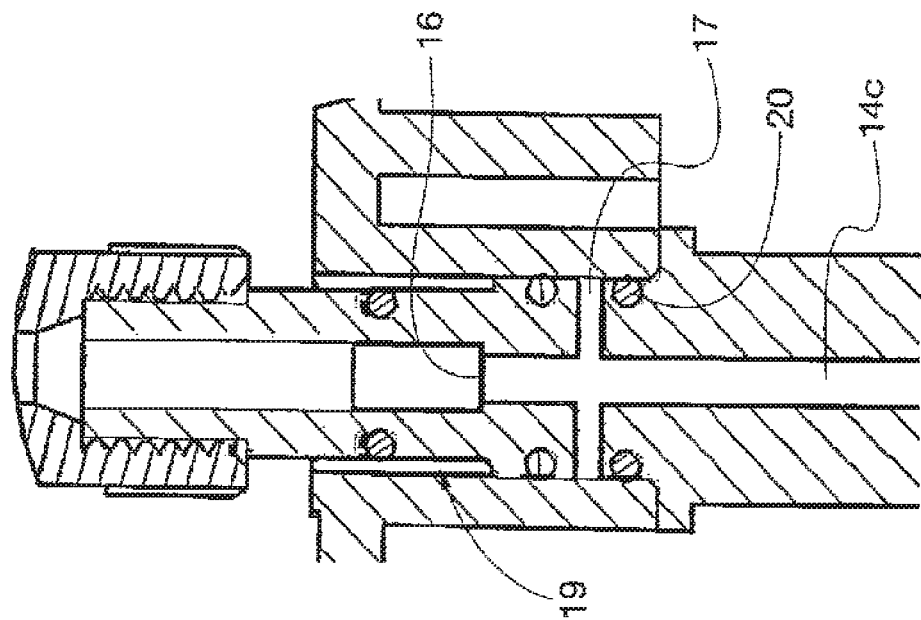
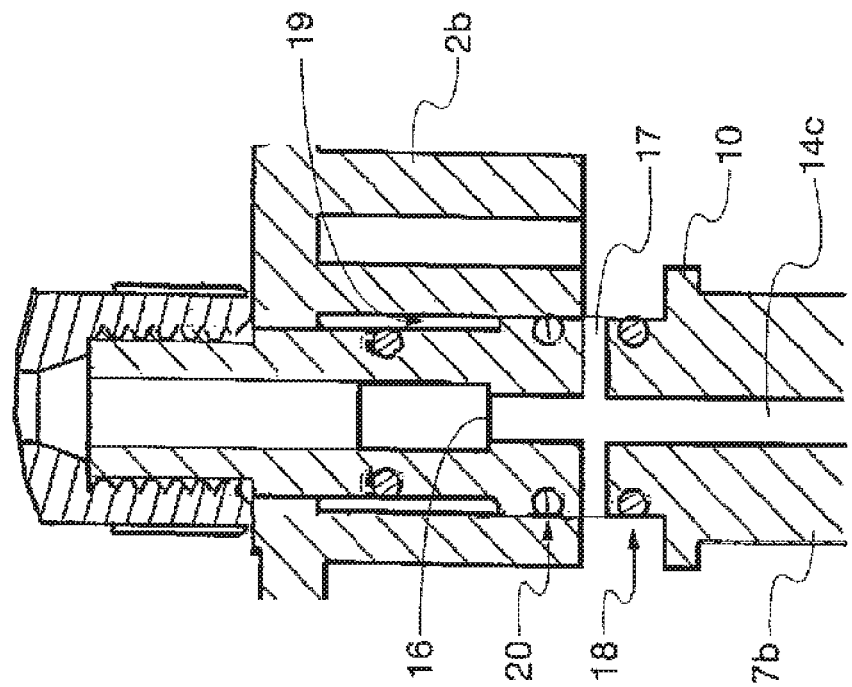

APPARATUS TO PREPARE BEVERAGES

CROSS REFERENCE TO RELATED APPLICATIONS

This application is a National Stage of International Application No. PCT/IB2014/001393 filed Jul. 25, 2014, claiming priority based on European Patent Application No. 13 178 837.4 filed Jul. 31, 2013, the contents of all of which are incorporated herein by reference in their entirety.

BACKGROUND OF THE INVENTION

The present application concerns a brewing apparatus designed to prepare beverages using a pressure higher than ambient pressure, using a diluent, preferably water, and an edible substance, preferably a pulverent, organic substance such as coffee.

FIELD OF INVENTION

Motor-controlled brewing units to prepare beverages are quite popular and are known as one of the main components of so called dispensing appliances. These appliances may be used for at-home or out-of-home use.

In particular are known brewing units that allow to vary the amount of powder material fed into the brewing chamber, in other words these units allow for differing amounts of material, e.g. coffee, to be inserted in the chamber where the relevant substances contained in the powder material are dissolved into and extracted by a solvent, thus allowing for the diluent to become a liquid with recognised organoleptic value for a beverage. An example of said beverage is coffee.

One issue with these brewing units is that their construction is usually complex, involving cams or levers that get dirt and require maintenance.

Another problem with such units is that the spent, i.e. leached, powder material (for instance the used "coffee-cake", that is the remains of the ground coffee used for the drink preparation) needs to be correctly expelled from the chamber into a receiving container. Known machines have a limited space to receive the spent cakes, so that the operators have to frequently remove the spent cakes from the receiving container.

U.S. Pat. No. 5,316,781 illustrates a brewing unit where the brewing chamber and the lower piston of the unit are movable along a vertical axis, the chamber is moved up and down by a spindle or rotating screw. Though the brewing unit is able to prepare beverages with different amounts of coffee, nevertheless this unit bears a complex, expensive design and moreover does not solve the issue of the space required for the "coffee-cake": this construction requires a receiving volume below the lowest point of the brewing unit to fit the receptacle of spent cakes in the dispensing unit. The result is a cumbersome and expensive construction.

CH673083 (U.S. Pat. No. 4,852,472) teaches another brewing unit, with axially moving pistons. In this case the construction is limited in its performance by the use of a spring which sets the second piston exclusively into a pre-controlled position.

EP2036467 embodies a unit with a moving brewing chamber in order to obtain a precise drop of the coffee cake, and by doing so it complicates the construction, and increases its cost including non-axially moving parts.

GB2019202A to Piloni and Valente shows a brewing unit using a single motor, although the displacements are controlled by levers and cams, which increase the complexity of the construction, and the perpendicular displacement of one of the piston, similarly to EP2036467, creates a more complex unit, subject to wear and tear and possible misalignments.

There is therefore the need for a solution to provide a simple, small and compact brewing apparatus which solves the aforementioned problems.

Moreover it is required that the apparatus can discharge spent coffee cakes in a container big enough to reduce the number of maintenance and cleaning cycles.

It is also required a design which allows for use of variable coffee amounts in the same machine, where such variation is maximised, in order to obtain the widest variety of beverages within the same construction. A further requirements is that the brewing apparatus, i.e. the brewing chamber and the relevant components, should be easily cleaned in a short time.

It is an aim of the invention to solve the above mentioned problems and to provide a brewing machine having a brewing group with the above discussed advantageous features.

DESCRIPTION OF THE INVENTION

The above aim is reached by means of the present invention, that provides a brewing apparatus according to claim 1.

The apparatus of present invention comprises: a) a brewing chamber having a wall to receive said ingredient; b) a first piston provided with liquid outlet or inlet means; c) a second piston, that is provided with a rod and with liquid inlet or outlet means, is co-axially movable with the chamber and is also movable within said chamber. The chamber is movable by driving means in a way known per se along a path having length L1 according to an axis (A-A) that is substantially vertical from a bottom position (Hmin) to a top position (Hmax), said path including a discharge position (Hdis) to discharge the ingredient from said chamber after the brewing step.

According to the invention, the chamber and the piston, when in said discharging position (Hdis) are both spaced from said bottom position (Hmin). With the wording "piston" it is meant the piston in its entirety, i.e. including the head and the rod; in case the rod is made of more than one part, all the parts of the rod are designated by the wording "rod". Thus, when in present invention it is said that "the chamber and the piston, when in said discharging position (Hdis) are both spaced from said bottom position (Hmin)" it is meant that all parts of the rod are spaced from the bottom position.

The second piston is movable within the brewing chamber by a length L2 that is substantially corresponding to the height of the chamber; generally, the bottom position (Hmin) is a position where piston and second chamber are abutting on the lower part, e.g. the base, of the apparatus and where L2 is zero because the head of the piston is aligned with the upper rim of the chamber. According to the invention, the chamber in the discharge position has L2=0, i.e. the piston is in the discharge position with respect to the chamber, and chamber and piston, including the rod (i.e. the complete piston), are spaced from the bottom position, i.e. they are spaced from the lower part of the apparatus.

According to an aspect of the invention, the rod of the second piston is extending through the bottom wall of the chamber whereby a free end of the rod is located outside said brewing chamber and is movable with the piston and the chamber.

Preferably, the rod is free from guiding means, from retaining means and from springs; this means that the piston is "passive", i.e. that there are no active means, i.e. springs, to change the position of the piston with respect to the brewing chamber.

Also, the rod is not connected to the apparatus by retaining means as in U.S. Pat. No. 5,367,947, nor is a part of the rod retained to the base of the apparatus when the remaining part of the rod is moved away from it with the brewing chamber, as taught e.g. by U.S. Pat. No. 5,316,781. The required position of the piston in the brewing chamber is obtained by moving the said chamber with respect to the piston as will be discussed in greater detail in the following description.

In order to maintain the second piston's head in a required position with respect to the brewing chamber, the piston's head or the rod, or both, are provided with friction means to control their movement with respect to the wall of said brewing chamber, namely with respect to lateral and bottom walls of the brewing chamber.

According to a preferred embodiment of the invention, the distance (L4) between the bottom position of the chamber and the discharge position is at least 15%, preferably at least 25% of the distance (L1) between said bottom position (Hmin) and the top position (Hmax). Most preferably, the discharge position (Hdis) is the highest one that can be used without interfering with other components of the apparatus.

In an exemplary embodiment, the first piston is located on the upper portion of the apparatus and the second piston with chamber is located under the first piston and can be moved to bring the first, upper, piston into contact with the second, lower, piston, inside the brewing chamber. The first piston is preferably movable co-axially to said chamber by a length L3, whereby the ratio of L2 to L3 is at least 6:1, preferably at least 10:1.

Preferably, the first piston, provided with the above mentioned features, has a beverage outlet duct, connected to a dispensing spout and to a venting duct; a valve is located on the outlet duct to selectively connect said beverage outlet duct either to the beverage dispensing spout alone, or to said dispensing spout and to the ambient air. The valve is located preferably on the venting duct and is provided longitudinally along a rod of the first piston. In greater detail, the venting duct has a closed end and at least one transversal duct extending through the venting duct and the rod to connect the venting duct to the ambient air; to this purpose, the portion of rod corresponding to the transversal duct is selectively movable into and out of a seat provided in the frame of the apparatus of the present invention, whereby when said portion is inserted into the seat the venting duct is closed.

It is therefore a further object of the present invention a brewing apparatus comprising a) a brewing chamber having a wall, b) a first piston provided with liquid outlet or inlet means, c) a second piston provided with liquid inlet or outlet means, said piston being co-axially movable with said chamber and being also movable within said chamber, wherein the brewing chamber is movable along a path according to an axis (A-A) by a length L1, the second piston is movable with said chamber and within said chamber, co-axially to said chamber, by a length L2, characterized in that said first piston is movable co-axially to said chamber by a length L3; and further characterized in that said first piston has a beverage outlet duct and a valve located on said duct to selectively connect said beverage outlet duct to a beverage dispensing spout or to said dispensing spout and to the ambient air.

The apparatus is provided with a discharge device for removing the spent "cake" of compressed and wet coffee or ingredient from the brewing chamber; in a preferred embodiment of the invention the discharge means is a rotating element position above the chamber. Said rotating element is provided with: a central part that is mounted pivotally around a pin that is connected to the brewing camber; a working portion to remove the spent coffee cake from the top of the second piston; and a projecting portion that extends from said central part and that is housed in a guiding means provided along a path substantially parallel to axis (A-A).

The projecting portion follows the guiding means and is operated by a change of direction of the said guiding means, that will result in a rotation of the working portion with respect to the brewing chamber; in a preferred aspect of the invention, a part of the guiding means is shaped to provide a double rotation of the working portion around the pin housed in the central part. According to the invention, the cited part of the guiding means is located at the highest possible point where the rotation of the discharge means can occur without interfering with other elements of the apparatus, namely without interfering with the hopper that is used to feed ground coffee to the brewing chamber.

Typically the brewing apparatus of the invention is part of a beverage dispensing machine additionally comprising the relevant parts usually associated to the brewing unit—these are readily available to the skilled in the art. A beverage dispensing machine that includes the brewing apparatus as above discussed is therefore a further object of the invention.

In particular the dispensing machine includes a microprocessor equipped controller and dedicated software, in order to perform a number of controls and in particular activating and controlling the absorption and angular displacement of the motor associated to the brewing apparatus, providing a source of heated or cold diluent, generally water, to the chamber, as well as the hydraulic pressure needed for the diluent to be directed into the brewing chamber, or preparation chamber, by pressure-creating means available to the skilled of the art, such as a vibration pump, or rotary pump.

The dispensing machine includes a user interface to allow command instructions by the user associated to differing beverage recipes. In other words, and more in detail, a user interface, such of the types readily available to the skilled in the art, allows the controller to provide a range of beverages based upon differing liquid and solid volumes of—respectively—diluent and ingredient, different temperatures of diluent, different operating pressures within the brewing unit's chamber, as well as different torques for the motor controlling the brewing unit, so that different degrees of compressions can be applied upon the edible material.

The dispensing machine includes also feeding means to deposit, respect to a user choice, different amounts of coffee powder into the infusion chamber and discharging means to discharge the spent coffee cake, from the infusion chamber, to a container.

A further object of the invention is a process of preparing a beverage by brewing an ingredient with a brewing apparatus according to any of the above discussed embodiments and combinations thereof, wherein the apparatus comprises: a brewing chamber having a wall; a first piston provided with liquid outlet or inlet means; a second piston provided with liquid inlet or outlet means, said piston being co-axially movable with said chamber and being also movable within said chamber;

wherein said chamber is movable along a path according to an axis (A-A) by a length L1, and said second piston is movable within said chamber, co-axially to said chamber, by a length L2 so that when L2 is zero, the piston is in the discharging position; feeding means to feed an ingredient to said brewing chamber; a discharge device for the spent ingredient after the brewing step;

wherein said process includes the steps of a) preparing an amount of ingredient, preferably ground coffee; b) feeding said ingredient to said brewing chamber; c) feeding water to said brewing chamber to brew and dispense a beverage from the ingredient; d) discharging the spent ingredient after said brewing step;

characterized in that:

during said steps a)-d) said chamber is moved along said axis into a plurality of positions by elongated driving means positioned parallel to said axis (A-A) of movement of said chamber, said driving means being driven by a motor, and in that step d) is carried out when L2 is zero and said brewing chamber and said piston have been moved upwards from said bottom position (Hmin) and have reached a height (Hdis) from the bottom of the apparatus that is spaced from said bottom position (Hmin). According to an aspect of the invention, the driving means that moves the chamber along said path is the only motor-controlled means in the apparatus, whereby the movement of said brewing chamber actuates said feeding means and said discharge means without using a spring or other biasing means and actuates the second piston without using springs or retaining means.

According to another aspect of the invention after brewing a coffee or another beverage said chamber is moved downwards to a bottom position (Hmin) on a base of the apparatus, e.g. the base of a frame of the apparatus, whereby said second piston is pushed through said chamber and reaches the upper rim of said chamber so that value L2 is zero and the spent coffee cake protrudes from the brewing chamber.

The chamber is subsequently moved upwards, with said second piston maintained in the mentioned position corresponding to L2=0 until a discharging position (Hdis) where the movement of the brewing chamber operates the discharging means.

According to a further aspect of the invention, after discharge step d), the brewing chamber is moved upwards until said first piston urges said second piston into the lowest possible position within said chamber, i.e. where L2 is maximum.

According to another aspect of the invention, at the end of step c) said first piston is moved by said brewing chamber downwards by a length L3, wherein the ratio L2/L3 is at least 6:1, preferably at least 10:1, to actuate a venting valve for completing step c).

The invention provides several advantages with respect to the prior art.

The presence of a free rod for the second piston, i.e. a rod that is free from springs and other biasing means, that has a free end and that is not retained in the base of the apparatus frame, results in the possibility of maintaining the piston in position L2=0 also when the chamber is moved upwards, thus having a discharge point for the spent coffee cake that is spaced from the base of the apparatus and that is much higher than in the known machines; this means that the container for the spent cakes can be bigger than what was previously known, with the relevant advantages in maintenance cycles.

Another advantage is that there are no springs or other actuating elements in the apparatus except for the worm screw that is rotated by a motor that is mounted on the machine, outside the brewing apparatus; as a result, the cleaning of the apparatus, once it has been removed from the beverage dispensing machine, is very easy and straightforward. Therefore, the apparatus is mounted in the machine with mounting means that can be easily and quickly reversed from a mounting position into a dismounting position.

A further advantage is that the volume of the chamber can be set at a desired value by controlling the movement of the second piston with respect to the chamber, i.e. by regulating L2: because there is no spring biasing the rod and the piston into the lowest position, as in the prior art devices, the piston will maintain the set position until it is further moved by the first, upper piston following a movement upwards of the chamber, or by the base of the frame, following a movement downwards of the chamber. This makes it possible to regulate the volume of the chamber as a function of the amount of ground coffee to be received in the chamber, so that the layer of coffee deposited on the second piston, before it is compressed, is more uniform than it is possible with prior art devices. The compressed coffee is thus also more uniform and during the brewing step extraction is improved, so that also the beverage quality will improve.

Still another advantage is that the second piston can be dismantled and removed from the chamber in a quick and easy way, to further facilitate cleaning and maintenance of the apparatus.

These and other advantages will be apparent from the following description of exemplary embodiments.

BRIEF DESCRIPTION OF THE DRAWINGS

An embodiment of the invention is more closely described, by way of example, in the following description and drawings, wherein:

FIGS. 7A and 7B are enlarged sections of a part of the first piston, showing opening and closing of the valve according to the present invention;

DETAILED DESCRIPTION OF THE PREFERRED EMBODIMENT

Figure 1:
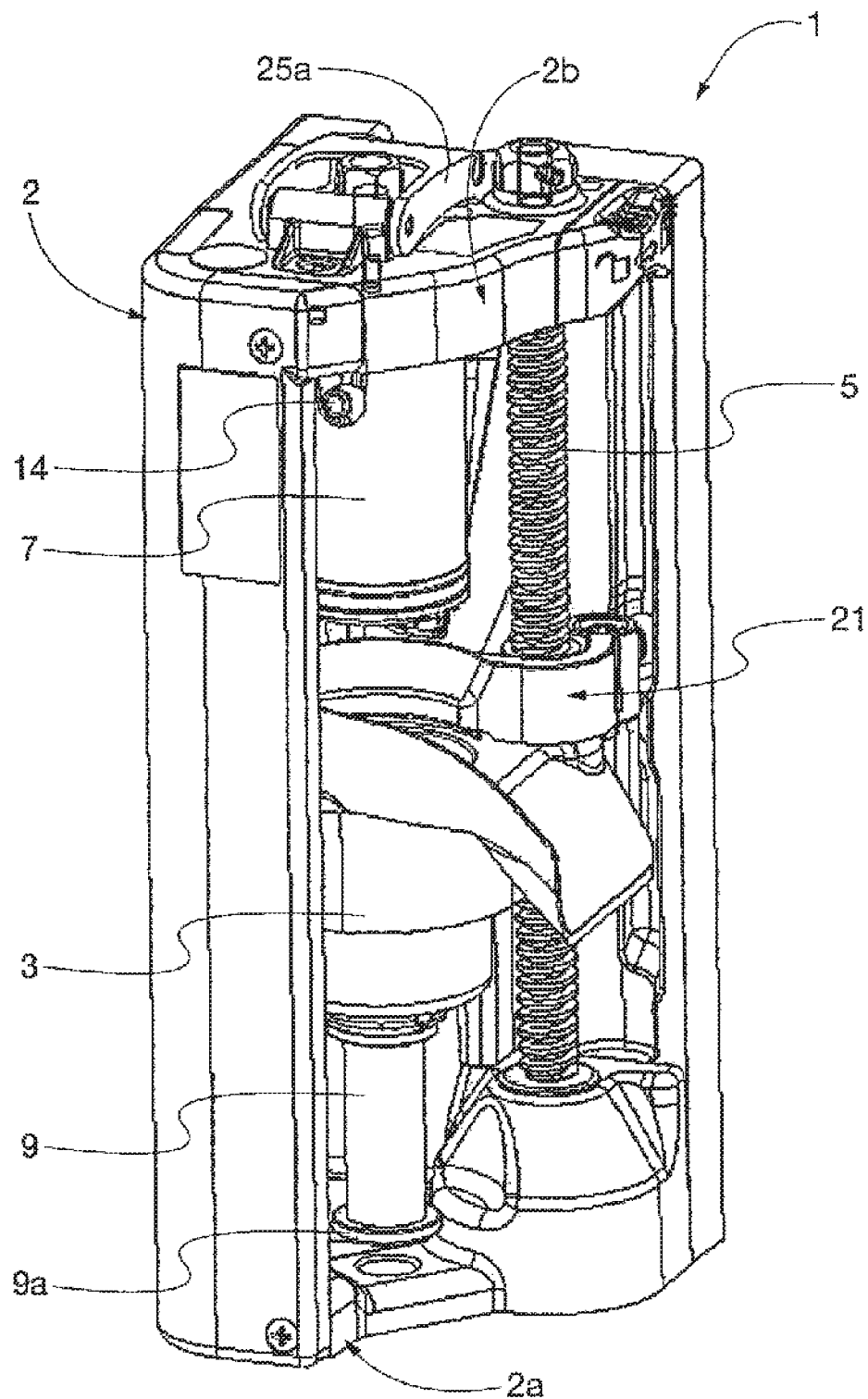
FIG. 1 is a perspective views of the brewing apparatus according the present invention.
Figure 2:
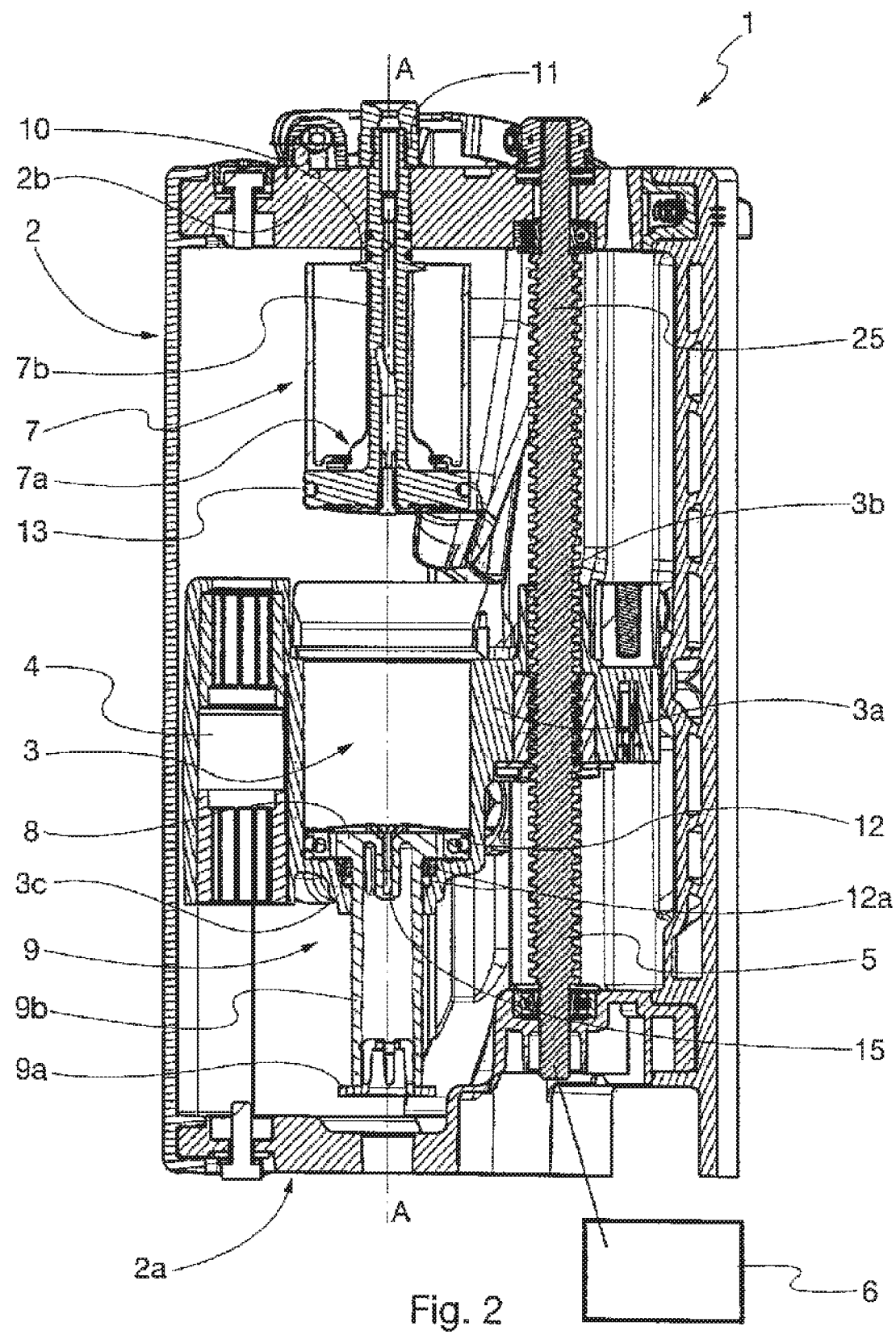
FIGS. 2, 3, 5 show partial longitudinal section viewed from different sides of the brewing apparatus according to the invention.

With reference to FIGS. 1 and 2, the brewing apparatus 1 for beverage preparation according to the present invention is the brewing group of a beverage dispensing machine and can be advantageously mounted and dismounted as a whole onto and from a beverage dispensing machine. The apparatus comprises a support frame 2, in which the components of the apparatus are housed, a brewing chamber 3 moveable with respect to the support frame 2 and driving means to move said brewing chamber 3 along a path from a lower position to an upper position. Lower and upper refer to the bottom and top of the apparatus according to FIG. 1 and are referred to as Hmin and Hmax in FIG. 4.

The apparatus also comprises a first piston and a second piston provided with liquid outlet or inlet means; in the preferred embodiment shown in the figures, there is provided a first, upper, piston 7 having beverage outlet means 14 and a second, lower, piston 9 having water inlet means 15; the second piston 9 includes a head 8, a rod 9b and a final rod portion 9a, piston 9 is co-axially movable with chamber 3 and is also movable within said chamber.

Typically, the brewing chamber 3 has a cylindrical shape and comprises an upper rim 3b, a lower wall including a rim 3c and a wall 3a coupled with driving means; the driving means comprise a rotary worm screw 5, pivotally constrained with the support frame 2, and an electric motor 6 (schematically shown as a box) wherewith the screw 5 is rotated. The outer part of wall 3a is coupled, in a way known in the art, on one side with a fixed guiding means 4 that allows a linear movement of the chamber, preventing rotation, and on another side with the worm screw 5 to transform the rotational movement of the screw 5 into a translational movement of the brewing chamber 3.

Electric motor 6 is preferably a step motor that is connected to screw 5 with a gear, such as a motor reducer, to rotate the screw 5 with great accuracy in positioning and to thus move the brewing chamber 3 to a plurality of target positions along a path that follows an axis A-A parallel to screw 5; axis A-A is the symmetry axis of brewing chamber 3.

According to an aspect of the present invention, axis A-A of the chamber is vertical or substantially vertical, i.e. if inclined it is inclined, with respect to the vertical, by an angle of less than 12 degrees, preferably less than 8 degrees, more preferably less than 3 degrees.

As previously mentioned, the brewing chamber 3 comprises a second piston 9 that has a head 8 that forms base wall of the chamber 3, a rod 9b and a free end 9a of rod 9b; piston 9 can be moved within chamber 3, by a length L2 e.g. to a position (see FIGS. 2 and 3) when receiving from hopper 25 an amount of ground coffee before brewing a beverage, to an upper position (Hdis, see FIGS. 4 and 5) to discharge the spent cake of compressed coffee after the brewing step, or to a position selected to regulate the volume of chamber 3 according to the amount of coffee powder that will be deposited in said chamber.

Head 8 of piston 9 is provided with sealing means 12, such as an O-ring, located on the side of the piston to ensure that no powder (or liquid) can exit the chamber between head 8 and wall 3a; said sealing means 12 produce a friction against the inner side of wall 3a, additional friction means 12a are provided between rod 9b and lower rim 3c of the brewing chamber 3. As a result, piston 9 is normally held in its position by the friction provided by the friction means 12 and, in particular, 12a; the position of head 8 will be thus maintained until it is forced in a new position. In particular, as described in the following, the movement of the head 8, within the brewing chamber 3, is due to a thrust by first piston 7 that will force the second piston 9 towards lower rim 3c of the chamber, or by base 2a of the apparatus frame that acts on rod 9b to move the head 8 towards upper rim 3b of chamber 3; the above actions occur when the brewing chamber 3 is moved along the axis A-A by the rotation of worm screw 5.

According to the invention, said chamber is movable along a path on axis (A-A) by a length L1, and said second piston is movable within said chamber, co-axially to said chamber, by a length L2: it is a feature of the invention that the ratio of L1 to L2 is at least 2.5:1, preferably at least 3:1. According to the invention, the brewing chamber 3 in the discharge position at Hdis will be spaced from the bottom position identified by Hmin and additionally piston 9 will be positioned at a value of L2=0.

Figure 4:
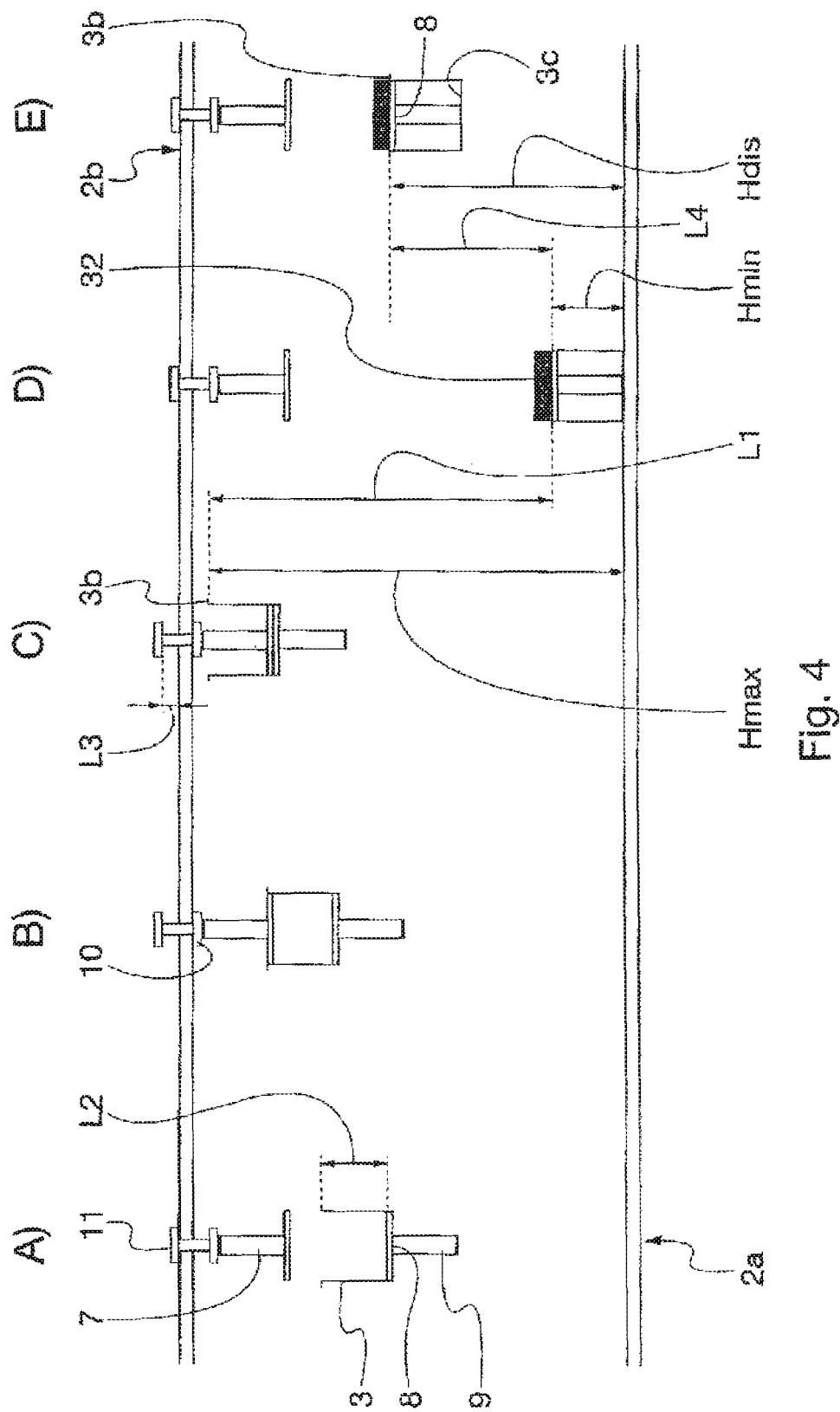
FIG. 4 schematically shows main configurations of the brewing chamber during a brewing process according to the present invention.
Figure 12:
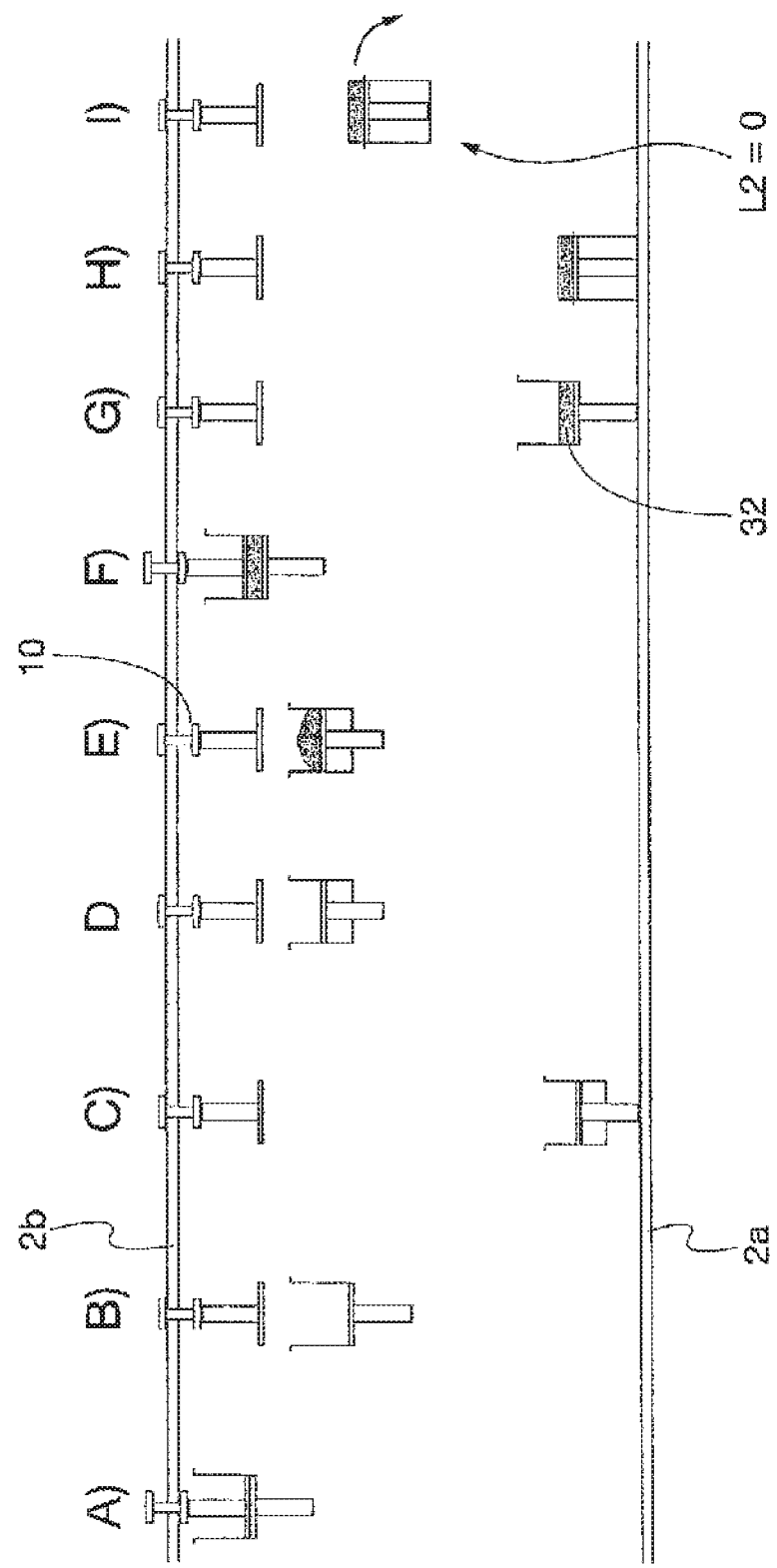
FIGS. 12 and 13 show the positions of the components of the brewing apparatus of the invention in two possible brewing cycles.
Figure 13:
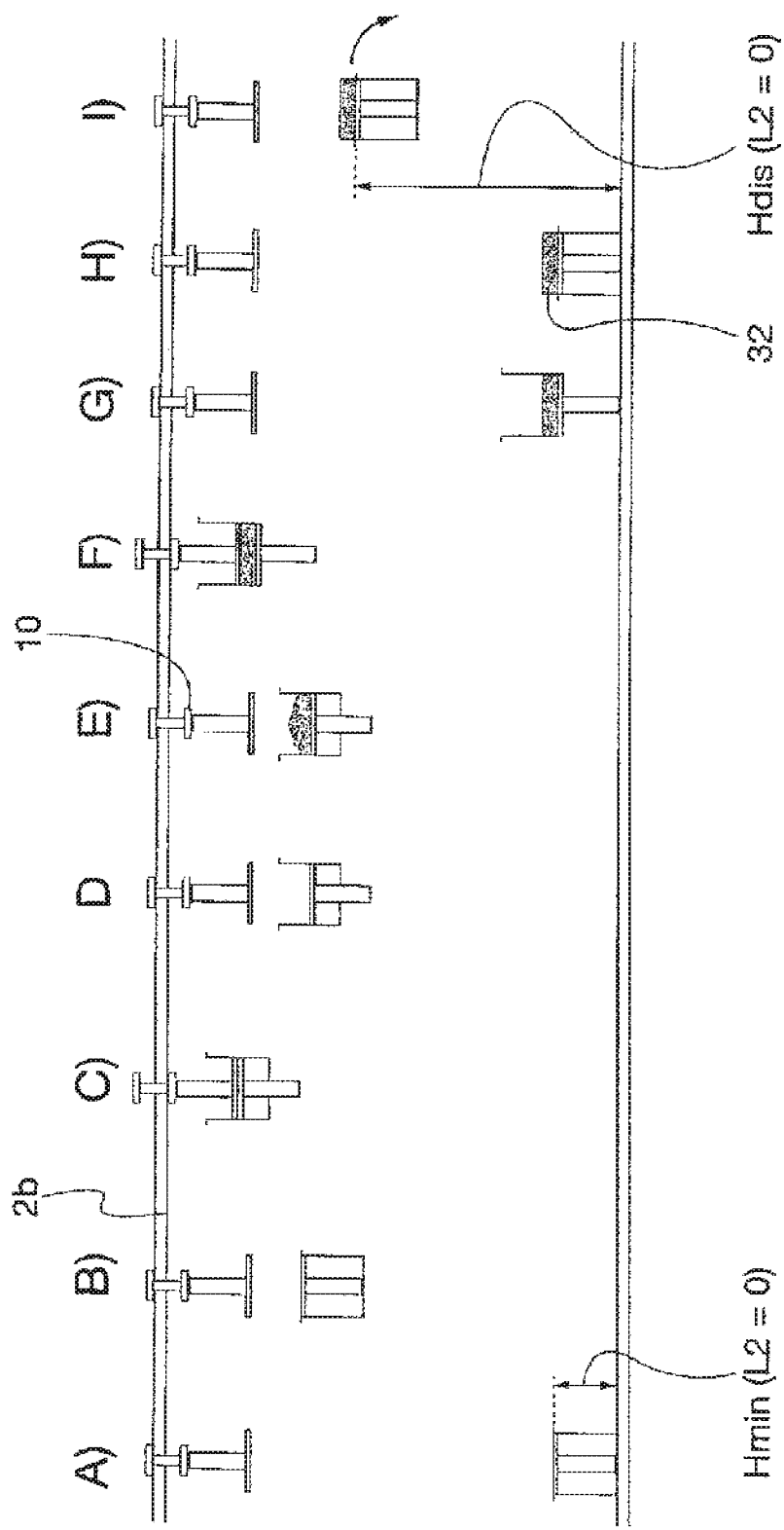

The movement of chamber 3, positions Hmax, Hmin and Hdis, and the lengths L1 and L2 will be disclosed in greater detail with reference to positions A-E shown in FIG. 4 and to positions A-I of FIGS. 12 and 13. Configuration A of FIG. 4 shows a position in which the piston 7 is disengaged from the brewing chamber 3, e.g. a position of stand by or a position in which ground coffee is received into the chamber from hopper 25, as shown also in FIG. 2.

As shown in FIG. 4 B, when chamber 3 is moved towards the upper base 2b of support frame 2, the piston 7 engages the inner side of the wall 3a of the chamber 3 and, if the chamber is empty, piston 7 eventually abuts the head 8 of piston 9, to move it downwards to a target position or however until it touches the upper part of the lower rim 3c of the chamber 3, as shown in FIG. 4C.

Figure 3:
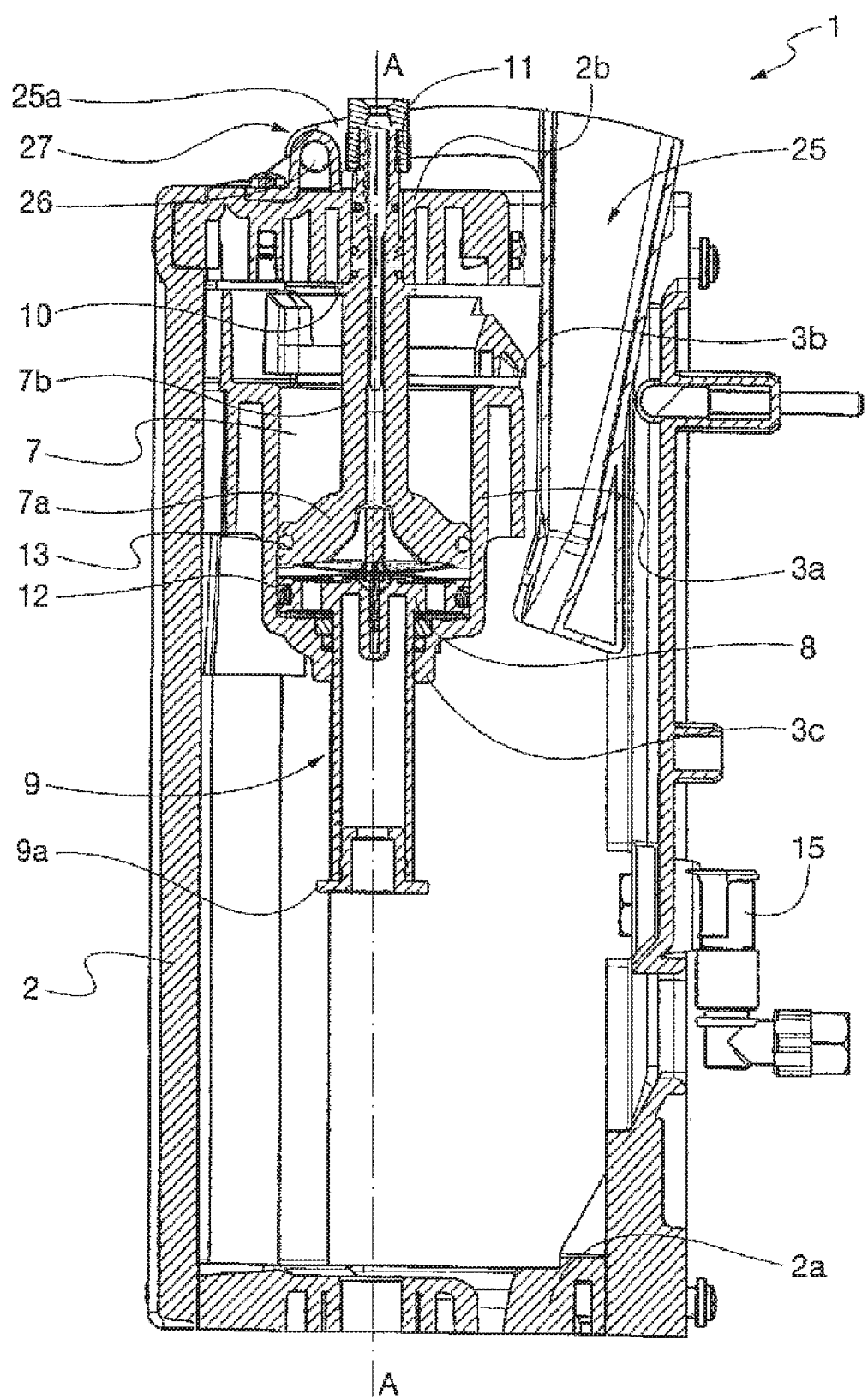

In this last configuration, shown also in FIG. 3, the chamber achieves a height Hmax, that is defined as the maximum distance between the lower base 2a of the support frame 2 and the upper rim 3b of the brewing chamber 3 achievable moving the chamber 3 along the axis A-A.

In other words, rotating the worm screw 5 by means of the motor 6, the brewing chamber 3 is moved upward until it engages the piston 7; after said engagement the piston 7 is pushed inside said chamber 3, and it pushes downward the head 8 of piston 9, preferably to its lowest possible position in the chamber 3.

Figure 5:
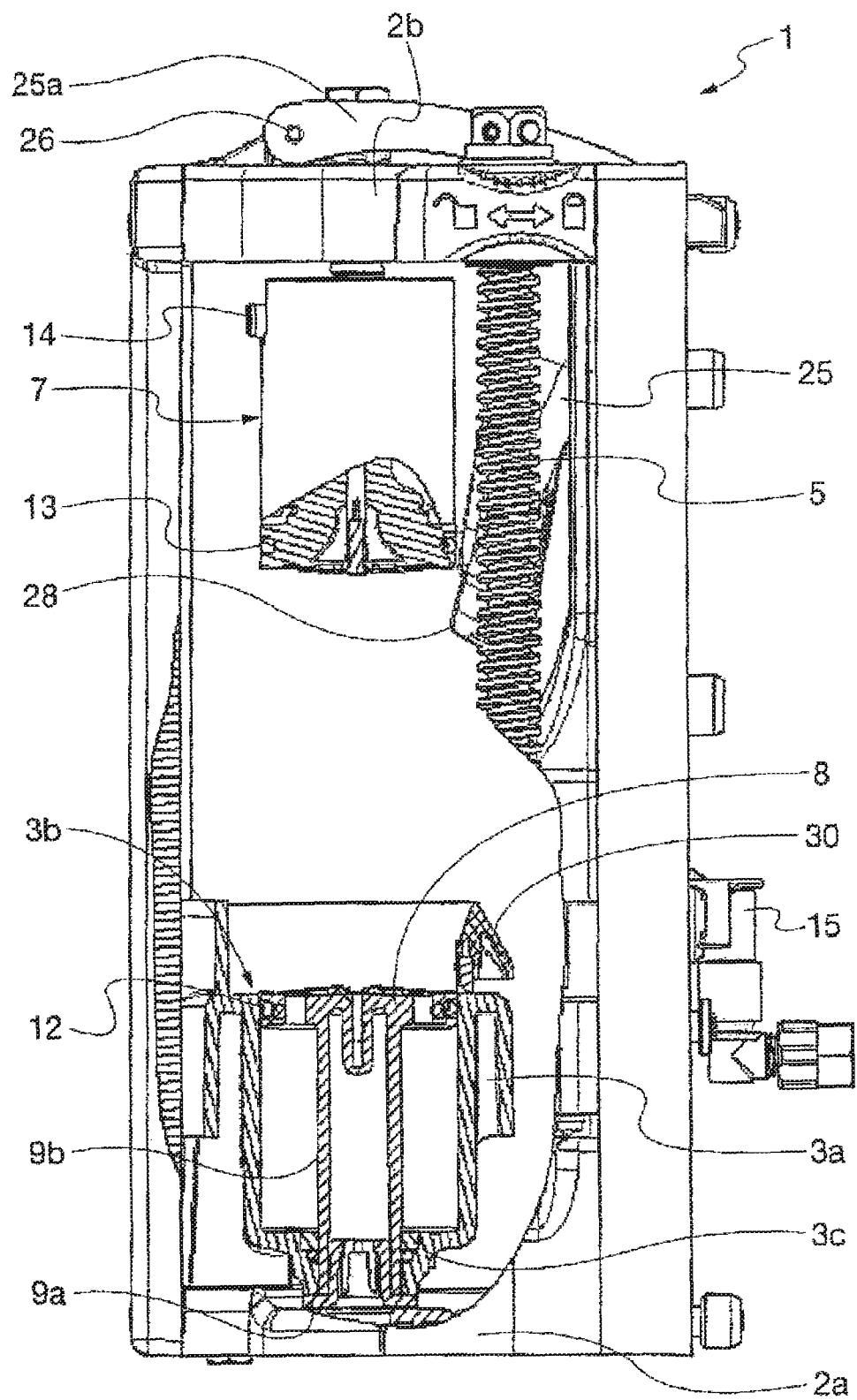

Position D of FIG. 4 and FIG. 5 show a configuration where the brewing chamber is located at its lowest position and head 8 of piston 9 is positioned at its highest position within the chamber, i.e. at a position where L2=0. To reach this configuration, head 8 is moved upward within the chamber 3 by means of rod 9b of piston 9; as visible in the figures and previously mentioned, the rod protrudes at least with its free end 9a from the lower part of the brewing chamber 3 and comprises a free end 9a located outside said brewing chamber that is movable with said piston and said chamber; in fact, when the brewing chamber is moved down, free end 9a of the piston 9 is moved downward until it abuts the lower base 2a of the support frame 2.

After this contact, said second piston 9 cannot proceed further down so that when moving the chamber 3 down, piston 9 goes trough the chamber until chamber 3 abuts against base 2a. In this position the lower part of the lower rim 3c of the brewing chamber 3 is in contact with the lower base 2a of the support frame 2 and piston's head 8 is flush (L2=0) with the upper rim 3b of the brewing chamber 3; chamber 3 achieves thereby its minimum height Hmin, that is defined as the minimum distance between the lower base 2a of the support frame 2 and the upper rim 3b of the brewing chamber 3 along the axis A-A.

Starting from this last configuration shown in FIG. 4 D, the chamber 3 can be moved upward and the free end 9a is moved together the brewing chamber 3 because the piston 9 keeps the set position by means of sealing means 12 and friction means 12a.

The difference between Hmax and Hmin is L1, this parameter is defined as the maximum displacement achievable by chamber 3, moving it along the axis A-A.

Concerning L2, this, as visible in FIG. 4, can be defined as the displacement achievable by the piston 9 moving within the brewing chamber 3; to put it in other words, L2 is the vertical distance between the upper side of said moveable base wall 8 and the upper rim 3b of the brewing chamber 3. The maximum value of L2 is when the configuration is as in position A of FIG. 4, 12 and in FIG. 3; the minimum value, i.e. L2=0, is achieved in positions D and E of FIG. 4, positions A, H and I of FIG. 13 and in FIG. 5.

One of the positions that the chamber 3 can stop at between Hmax and Hmin is the position in which the cake formed by the spent, i.e. leached, coffee (or other ingredient) is removed from the chamber.

According to an aspect of the present invention, the ratio of L1 to L2 is at least 2:1, preferably at least 3:1; the distance L4 between said bottom position of said chamber and said discharge position, i.e. Hdis-Hmin is at least 25% of the distance L1 between said bottom position (Hmin) and said top position (Hmax). This particular ratio is achievable because the second piston 9 has a free end 9a movable together with the brewing chamber and the piston 9; said free end 9a is not fastened with the support frame 2 and it is free from guiding means, from retaining means, and from springs so that when the chamber is at Hdis L2=0.

Figure 8:
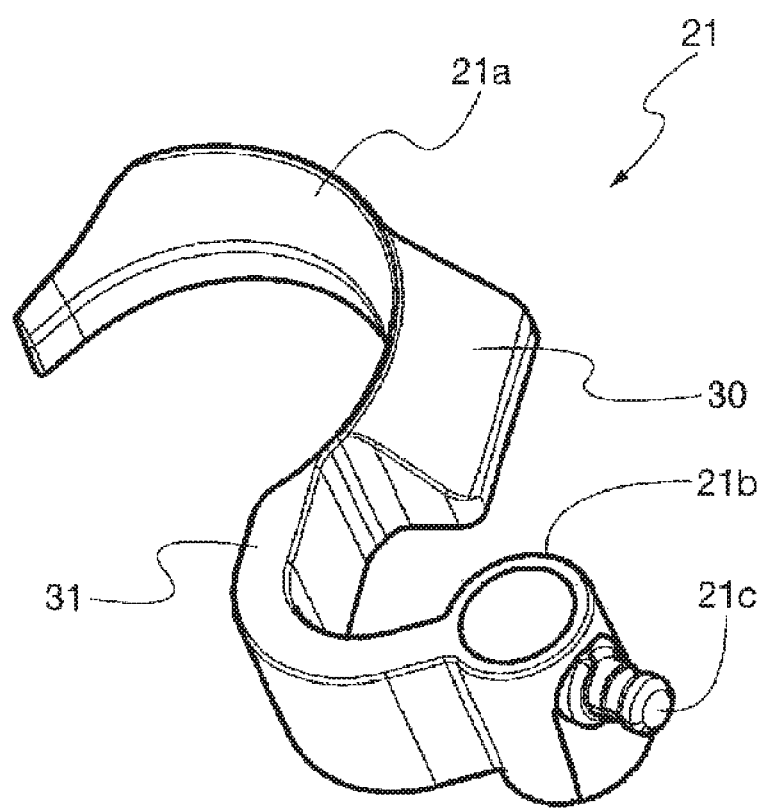
FIG. 8 shows a detail of the discharging means according to the invention.
Figure 9:
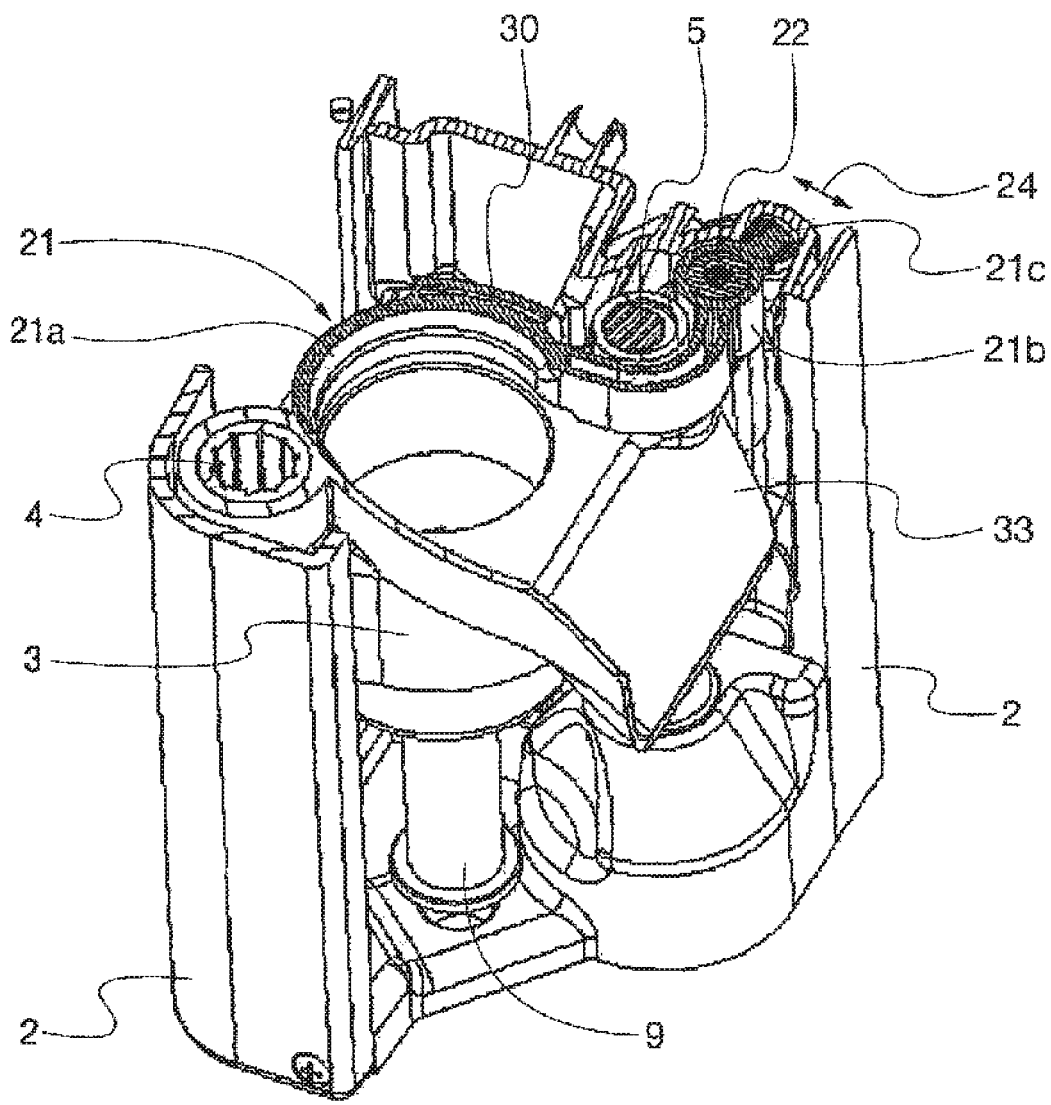
FIG. 9 shows a perspective partial transversal section view of the brewing apparatus according to the invention.
Figure 10:
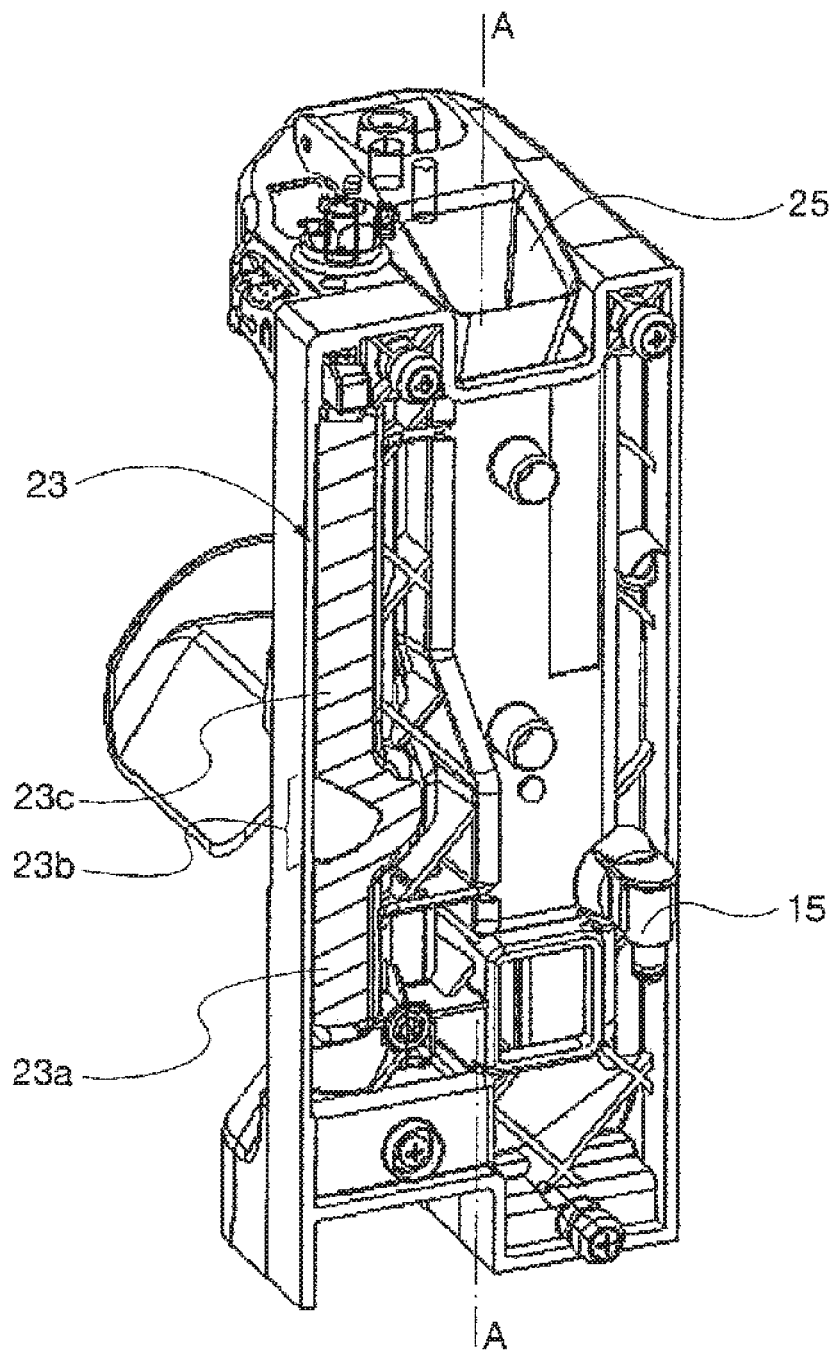
FIG. 10 is a perspective view from the back side of the brewing apparatus of the invention.

According to a further aspect of the present invention, the brewing apparatus 1 further comprises a discharge device 21 for discharging the spent, i.e. leached, cake of coffee or other ingredient after brewing; as visible in FIGS. 8, 9 and 10, said discharge device 21 for the spent cake is provided with a central part 21b that is mounted pivotally around a pin 22 that is connected to and supported by said brewing chamber 3.

From said central part 21b extends a working portion 21a, i.e. the portion that will sweep the cake of used and spent coffee, that is shaped as a part of a circle and that can rotate to remove the spent coffee cake 32 from the top of the head 8 of piston 9; from central portion 21b extends, at an angle with respect to working portion 21a, a projecting portion 21c that extends from said central part 21b and that is much shorter than working portion 21a and that is housed in a guiding means 23, said guiding means 23 extending along apparatus 1, substantially parallel to the said axis (A-A), as visible in FIG. 10.

Working portion 21 is connected to central part 21b by means of an arm 31 that is L-shaped to allow correct rotation of the device; preferably, portion 21 is also provided with an inclined surface 30 directed to the side opposite the side of the chamber 3, that forms a cam, whose use is discussed in greater detail hereinbelow. The use of inclined surface 30 is to contact the bottom of the hopper 25 and rotate it out of the way so as to allow chamber 3 to move to its maximum height position of FIG. 3; also, inclined surface 30 can regulate the inclination angle of hopper 25 with respect to brewing chamber 3.

As shown in FIGS. 1 and 9, the discharge device 21 is located above the brewing chamber 3 and it is moved together with said chamber 3 along an axis parallel to the axis A-A of the chamber; in particular discharge device 21 is pivotally constrained with said brewing chamber 3 by a pin 22 with a rotation axis parallel with the axis A-A.

By rotating the central part 21b of the device 21 about said pin 22, the working portion 21a is moved with respect to said brewing chamber 3 according to a movement perpendicular to axis A-A. The rotation is actuated by means of the projecting portion 21c that is moved along a particular path defined by the guiding means 23.

In particular, as visible from FIGS. 9 and 10, the projecting portion 21c is coupled with and housed in guiding means 23, that have the form of a track that extends along the apparatus substantially parallel to axis A-A: when the brewing chamber 3 is moved along the axis A-A, the projecting portion 21c follows the track of the guiding means 23 and will transmit to the working portion 21a any change of direction of the guiding means 23 in the form of a rotation of portion 21 a.

With respect to FIG. 10, said guiding means 21 comprises, starting from base 2a, a first portion 23a with a track parallel to the axis A-A, a second portion 23b shaped as a double-curve track and a third portion 23c that is parallel to axis A-A; preferably, the two curves from the vertical path are as close as possible to 90°. When the projecting portion 21c follows first or second portions 23a, 23c of the guiding means 23 discharge device 21 is in a "resting" condition, in the position shown in FIG. 1 and FIG. 9, i.e. with chamber 3 open and free; no rotation of the working portion 21a of the discharge device 21 occurs during translation of device 21 along portions 23a and 23c.

When the projecting portion 21c follows said second portion 23b of the guiding means 23, it is moved twice in a transversal direction as shown by the arrows 24 in FIG. 9; this movement produces a double rotation of the working portion 21a and in particular, a first rotation from the resting position of FIG. 1 and FIG. 9 towards the right side of FIG. 9, i.e. to the slide 33 provided laterally to brewing chamber 3, and a second rotation in the opposite direction, back to the resting position.

Thus, by locating the shaped portion 23b of the guiding means 23 in a determined position along the axis A-A, it is possible to choose where to have the spent coffee cake 32 to be swept away in a cakes container (not shown) by the working portion 21a of the discharge device 21. According a preferred aspect of the present invention, said shaped portion 23b of the guiding means 23 is located as close as possible to the first piston 7 so as to have the highest possible point of rotation of device 21.

It should be noticed that discharge device 21 is actuated to make a double rotation around the pin 22, each time the brewing chamber 3 is moved across the shaped portion 23b of the guiding means: i.e. a double rotation is carried out also when the chamber is being moved down after the brewing step, i.e. in a configuration where piston 9 is in a lowered position with L2>0 and the coffee cake is housed inside the chamber. This is a peculiar aspect of the invention, that makes it possible to obtain the required technical effect of having a high point of discharge of the spent cakes.

Similarly to second piston 9, also first piston 7 is provided with sealing means 13, such as an O-ring, located on the side of piston 7 to ensure that no liquid can exit the chamber between piston 7 and wall 3a. The sealing means 13 produce a friction force between piston 7 and the inner side of the wall 3a of the brewing chamber, so that the piston 7 can be moved by chamber 3 when piston 7 engages chamber 3.

In a further embodiment of the present invention, the upper part of said piston 7 is in the form of a rod 7b coupled with the upper base 2b of the support frame 2 in the manner such that said first piston 7 can be freely moved between two limits 10 and 11; the first limit 10, in the form of a flange, is provided in the portion of said rod 7b located under the upper base 2b of the support frame 2; a second limit 11 is provided in the portion of said rod 7b located above said upper base 2b, thus the piston 7 can be moved freely through the upper base 2b between said limits 10 and 11 by a distance L3 that can be defined as the maximum displacement achievable by the piston 7.

When the chamber 3 is moved towards the upper base 2b of support frame 2, the sealing means 13 of the piston 7 engage the inner side of wall 3a of the chamber 3, and the piston 7 is moved upward together with chamber 3 until the first limit 10 touches the upper base 2a of the support frame 2. At this point, the piston 7 cannot move further upwards: only the brewing chamber 3 can move and, consequently, said piston 7 will eventually contact piston 9 and move it to the required position.

Most preferably the required position for piston 9 is the bottom of chamber 3, as shown in position B of FIG. 4 or in position A of FIG. 12. In this position it is possible to check if there is any remaining coffee powder in the chamber after discharging of the spent coffee cake 32; to this purpose, apparatus 1 is provided, in a way known per se in the art, with sensor means (not shown) suitable to detect the position of the chamber 3 along path L1. The sensor means can detect the position of the chamber when chamber 3 is in the above discussed configuration of FIG. 3; if the chamber has been correctly emptied of the spent coffee (or other ingredient), chamber 3 will have reached its maximum height Hmax, i.e. it will be at the end of path L1. In this case, the control unit after comparing the position detected by the sensors with the value memorized as the correct one for Hmax, will consider the chamber as correctly empty and will authorize the continuation of the cycle.

If there is some coffee remains in the chamber, the chamber will not be able to reach Hmax and the sensors will detect a "wrong" position of the chamber. In this case, the control unit will order to repeat the discharging step before the cycle is continued.

When the chamber 3 is moved downward, piston 7 is moved downward with the chamber because of the friction force of sealing means 13. However, the first piston 7 is moved downward only until the second limit 11, e.g. a nut, reaches the outer side of the upper base 2b of the support frame 2 and after this contact the piston 7 is blocked against further movement downwards, as shown in FIG. 4 E and is therefore disengaged from the brewing chamber 3.

The above arrangement of the first, upper, piston is provided in order to have a venting valve for the outlet means, including the spout as per the following explanation.

According to an aspect of the present invention (see FIGS. 6, 7a and 7b), the first piston 7 is provided with liquid outlet 14 and the second piston 9 is provided with liquid inlet 15. In particular, said first piston 7 has a beverage outlet duct 14a housed in the rod 7b of said piston 7 and said duct 14a includes a beverage dispensing spout 14b, wherein a valve is located on said duct 14a to selectively connect beverage outlet duct 14a to a beverage dispensing spout 14b or both to said dispensing spout 14b and to the ambient air.

Figure 6:
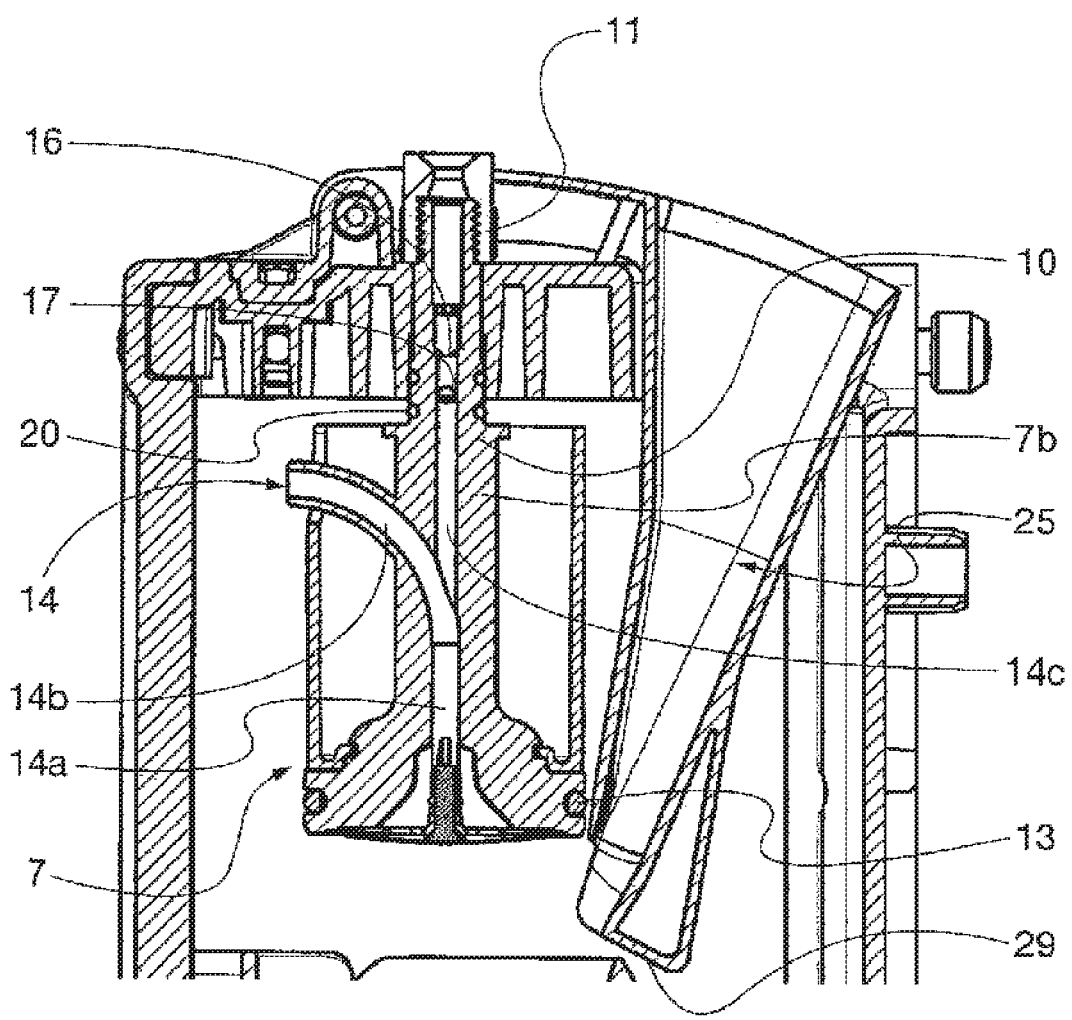
FIG. 6 is a longitudinal section of the upper part of the apparatus of the invention, including first piston.

In the exemplary embodiment shown in FIG. 6, the first piston 7 has a beverage outlet duct 14a housed in the rod 7b of said piston 7 and said duct 14 includes a beverage dispensing spout 14b and a venting duct 14c connected together; the venting duct and part of the dispensing spout 14b are housed in the rod 7b of the first piston 7 and in particular, as shown in FIG. 6, said venting duct 14c and said outlet beverage duct 14a are provided longitudinally to said rod 7b, the beverage dispensing spout 14b has a curved shape and it exits transversally from the rod 7b of the piston 7 to be connected to a final portion of the spout, e.g. a duct in plastic or silicone, that is not shown in the figures.

According to an exemplary embodiment of the present invention, the venting duct 14c has a closed end 16 (e.g. obtained with a plug) and at least one transversal duct 17 extending through said venting duct 14c and said rod 7b to connect said internal venting duct 14c to the ambient air, i.e. to the outside of the rod. With reference to FIG. 7, the portion 18 of rod 7b corresponding to said transversal duct 17 is located between first limit 10 and second limit 11, as mentioned before, said portion 18 is movable into and out of the upper base 2b of the support frame 2.

In particular, when the piston 7 is moved upwards, said portion 18 of said rod is moved into a seat 19 provided in the upper base 2b of the frame 2; vice versa when the piston 7 is moved down, said portion 18 of rod 7b is moved out of said seat 19.

Thus, when portion 18 of rod 7b, including transversal duct 17 of venting duct 14c is moved into said seat 19, the venting duct 14c is closed, as shown in FIG. 7 B and the ambient air is disconnected from the outlet beverage duct 14a and from the beverage dispensing spout 14b; vice versa, when said portion 18 of rod 7b is moved out of said seat 19 the venting duct 14c is connected with the ambient air and consequently also the outlet beverage duct 14a and the beverage dispensing spout 14b are connected with the ambient air. Further sealing means 20, as such O-ring, are provided in said portion 18, above and under the transversal duct 17, to seal the transversal duct 17 when the portion 18 of rod 7b is moved into the seat 19.

In other words, the portion 18 of rod 7b corresponding to the transversal duct 17 of the venting duct 14c is in the form of a valve located in said venting duct 14c to selectively connect said beverage outlet duct 14 to a beverage dispensing spout 14b or to said dispensing spout 14b and to the ambient air.

The opening and closing of said valve is operated by chamber 3 and is indirectly controlled by motor 6 that, rotating the worm screw 5, moves respectively down and up the brewing chamber 3 and consequently the first piston 7, by a distance L3.

According to an aspect of the present invention, the ratio of L2 to L3 is at least 6:1, preferably at least 10:1. This ratio allows to obtain a simple valve, controlled by the motor 6, that moves the brewing chamber 3, and to keep the apparatus structure very compact. Alternatively a motor controlled valve may be provided.

The brewing apparatus 1 according to the present invention further comprises a hopper 25 or similar feeding means to feed an ingredient, namely a ground material, especially ground coffee, to the brewing chamber 3 from a container or a grinding device (not shown) located above the hopper.

Hopper 25 is pivotally mounted on apparatus 1 (see e.g. FIG. 3) at a mounting position 27 that is located above the first piston 7; in particular the hopper 25 comprises an arm 25a that extends from said mounting position 27 to said hopper 25; arm 25a is pivotally fastened, in said mounting position 27, to the upper base 2b of the support frame 2 by a pin 26. With respect to FIG. 3, the hopper 25 can rotate freely around an axis perpendicular with the axis A-A, preferably the pivoting axis of the hopper is not intersecting axis A-A.

According to an advantageous aspect of the present invention, hopper 25, in its resting position, is pivoted towards said first piston 7 by mere gravity, without use of springs or biasing means as in prior art. The hopper is mounted asymmetrically with respect to the pin 26 of rotation, so as to be normally forced by its own weight to rotate toward the upper piston 7, in fact the hopper 25 is located at one side of the first piston 7 whilst the mounting position 27 of the hopper 25 is located above and on the other side of said first piston 7.

As shown in FIG. 5, the lower edge 28 of said hopper 25, in its resting position, is located on the path to be followed by brewing chamber 3 or by discharge means 21 for the spent coffee cake 32.

Figure 11A:
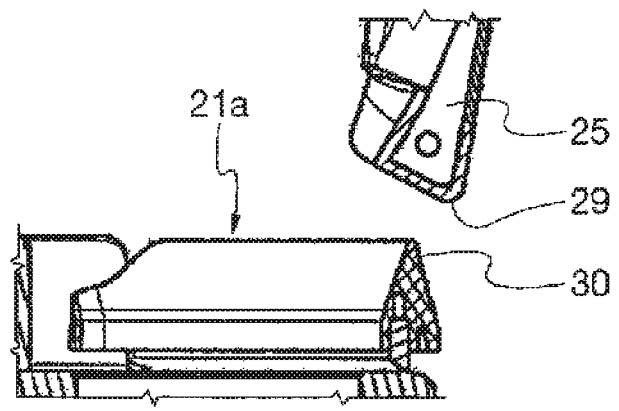
FIGS. 11A, 11B and 11C show possible positions of the hopper according to the present invention with respect to the brewing chamber.
Figure 11B:
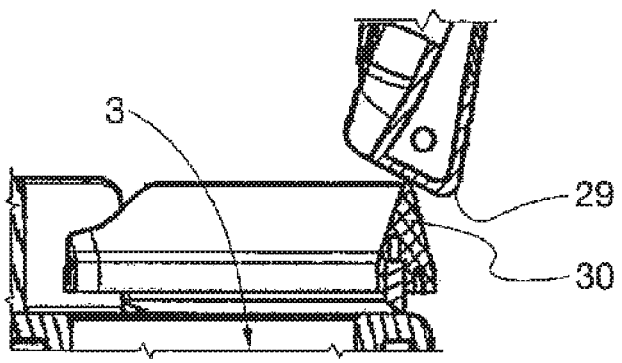
Figure 11C:
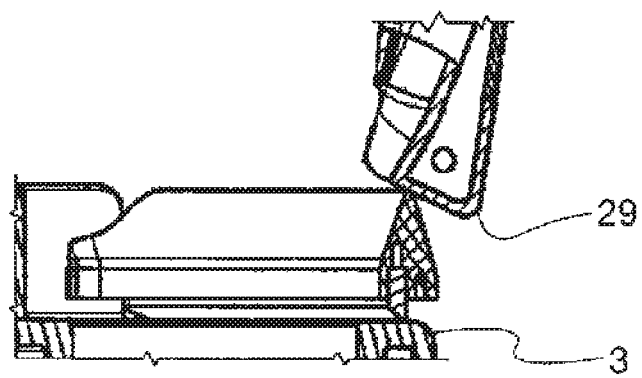

Because of this possible interference, the lower edge 28 of the hopper 25 and the brewing chamber 3 or the discharge means 21 arranged above the brewing chamber, are provided with cam surfaces 29 and 30 that are angled and shaped in such a manner that when the brewing chamber 3 is moved upward, the cam surface 30 engages the cam surface 29 of the lower edge of hopper 25, as shown in FIG. 11 B.

When the chamber is moved upwards, the hopper 25 is rotated and moved away from the first piston 7 as shown in FIG. 11 C, by action of cam surfaces; vice versa when the brewing chamber 3 is moved down, the hopper 25 is rotated and moved toward the first piston 7 until the cam surfaces 29 and 30 are disengaged and it is achieved the resting position as shown in FIG. 11 A.

Thus, the tilt angle of the hopper 25 can be controlled according to the position of the brewing chamber 3 along the axis A-A so as to deposit a determined amount of coffee power in the brewing chamber 3 with a determined distribution. Greater details of this feature and of the relevant process of regulating the angle of the hopper can be found in co-pending application, filed on the same day as the present application, in the name of the present applicant, with title "Process and apparatus for preparing and dispensing coffee", in particular with reference to claims 1-13 of said application that are hereto incorporated by reference.

As previously mentioned, according to an aspect of the present invention, the worm screw 5 is the only element of said apparatus 1 that is directly operated by a motor 6; as mentioned above, the motor 6 is preferably a step motor, to operate with precision small displacement of the brewing chamber 3 along the axis A-A and consequently to achieve accurate tilts of the hopper 25.

The preferred steps to prepare a beverage by means of the apparatus 1 according to the present invention are hereinafter summarized with reference to the figures, especially FIGS. 12 and 13. The cycle in FIG. 12 starts from a brewing chamber in a Hmax configuration: here the value of L2 is obtained in position C by stopping the second piston 9 and controlling the downwards movement of chamber 3 with respect to (still) piston 9. The cycle in FIG. 13 starts from a brewing chamber in a Hmin configuration: here the value of L2 is obtained in position C by controlling the upwards movement of chamber 3 with respect to first piston 7, that is in a still condition.

A user selects the desired beverage from an interface of a dispensing machine that comprises the brewing apparatus 1 according to the present invention; according to said user's choice, a determined amount of coffee powder has to be fed to the brewing chamber 3.

Initially the brewing chamber 3 is in a stand-by position as the one shown in FIGS. 4*a* and 12 B, where the volume of chamber 2 is the maximum possible volume, i.e. L2 has the maximum value; if a change of L2 is required, chamber 3 is moved down, rotating the worm screw 5 by means of the motor 6, until rod 9*b* is blocked by base 2*a* of the apparatus' frame 2 and further downwards movements of the chamber will move head 8 of piston 9 towards rim 3*b* of the chamber, thus reducing it's the chamber's volume to the required one, as visible in position C of FIG. 12.

By detecting the position of chamber 3 and knowing the value required for L2, it is possible to calculate the amount of displacement of the piston's head 8 from the bottom rim of chamber 3 and, consequently, the remaining volume of chamber 3, i.e. the volume of the chamber for the feeding of the ground coffee or other ingredient.

In general, the smaller is the amount of coffee required, the smaller is the volume requested for the brewing chamber and the smaller is L2. Once achieved the desired value of L2, the chamber 3 is moved toward the first piston 7, and the amount of coffee powder required for the beverage selected by the user is fed to the brewing chamber by means of the hopper 25; as above mentioned, before and/or during said deposition, the tilt of the hopper 25 is preferably, but not necessarily, controlled to achieve a determined distribution of the coffee powder in the brewing chamber.

This is obtained by rotating the worm screw 5 by means of the step motor 6: the cam surface 29 of the lower edge of the hopper engages the cam surface 30 of the brewing chamber 3, the brewing chamber is moved upward or down to achieve a desired tilt of said hopper 25 and consequently the required distribution of the coffee powder in the brewing chamber, as per position E of FIGS. 12 and 13.

Once the requested amount of ground coffee has been fed to the brewing chamber, said coffee is pressed, moving chamber 3 towards the first piston 7; as mentioned above, when the piston 7 engages the chamber, it is moved upward until flange 10 is stopped by upper base 2*b* of the frame 2, as in position F of FIGS. 12 and 13. In this configuration, venting duct 14*c* is closed because the portion 18 of rod 7*b* corresponding to the transversal duct 17 of the venting duct 14*c* has been moved into seat 18 of upper base 2*b* and is sealed in it by sealing means 20.

The brewing chamber 3 is moved upwards against the first piston 7 until the coffee powder achieve the required compression; the correct amount of pressure is detected in any known way, such as by means of the absorption of motor 6 or by means of a pressure sensor located in the rod of the piston.

Once the desired pressure is achieved, a determined amount of hot water with a determined flow rate is fed into the brewing chamber from a liquid inlet 15, by means of a pump; as mentioned, said liquid inlet is preferably located in the second, lower, piston 9, thus the hot water entering in brewing chamber 3, extracts the coffee powder and the brewed beverage rises to the outlet duct 14*a* located in the first, upper, piston 7.

Until now, the venting duct 14*c* is closed (see FIG. 7B) and thus the beverage can exit only passing from the beverage dispensing duct 14*b*. After the required amount of hot water has been fed in the brewing chamber 3, motor 6, rotating the worm screw 5, moves downwards the brewing chamber together with first piston 7, until limit 11 contacts the frame. Piston 7 is initially moved together with chamber 3 because of the friction force between sealing means 13 of piston 7 and the inner side of the wall 3*a*. Thanks to this movement, the venting duct 14*c* is opened and the outlet duct 14*a* is vented and emptied toward dispensing spout 14*b* (FIG. 7A).

After the brewing process, the brewing chamber 3 is moved down. During the downwards movement projecting portion 21*c* of discharge device 21 is operated by portion 23*b* of guide means 23, so that the discharge device is actuated even if there is no cake of spent coffee to be discharged from piston 9 because L2 is greater than 0 and the cake of spent coffee is housed within the chamber 3.

Downwards movement is continued: the free end 9a of the second piston 9 abuts the lower base 2a of the support frame 2 (see position G of FIGS. 12 and 13), chamber 3 continues its descending movement and head 8 of piston 9 is moved upward until L2=0, i.e. until the lower rim 3c of the chamber 3 abuts the lower base 2a of the frame 2 (see position D FIG. 4, where the coffee cake is shown with numeral 32, and position H of FIGS. 12 and 13).

As mentioned above, in this configuration L2=0 and the head 8 is flush with the upper rim 3b of the brewing chamber 3 and the spent coffee cake 32, above it, is located outside of said chamber 3 (see also FIG. 5, where cake 32 is not shown).

At this point, the brewing chamber 3 is moved upward and head 8 keeps the position flush with the upper rim 3b of the chamber 3 by means of the friction force between the sealing means 12, friction means 12a and the inner side of the wall 3a. When the projecting portion 21c of the discharge device 21 meets the shaped portion 23b of the guiding means 23, as described above, L2 is still zero, so that the working portion 21a is rotated and the spent coffee cake 32 is discharged (position I of FIGS. 12 and 13 and position E of FIG. 4) to a container with an opening located in proximity of the brewing chamber when the projecting portion is in the shaped portion of guiding means.

Chamber 3, now empty, is moved to its maximum height Hmax (position C of FIG. 4 and of FIG. 13, position A of FIG. 12) to check that all the coffee cake has been removed from the chamber; from this position, if correctly emptied, the chamber will be moved back into the stand-by position of FIGS. 1, 2 and 4A until a new beverage has been selected and the cycle starts again.

Summarizing, rotation of the worm screw 5, by means of a step motor 6, will result in reaching a selected position of the brewing chamber 3 along the axis A-A; said position, allows to control:

the brewing chamber 3 volume, by means of the first and/or second pistons 7, 9;
the tilt of the hopper 25, by means of the cam surfaces 29, 30;
the pressure of the coffee powder in brewing chamber 3, by means of second piston 9
the opening and closing of a valve in the venting duct 14c
the discharge device 21, by means of the second piston 9 and the projecting portion 21c moved along the guiding means 23.

As mentioned above, the presence of a free piston 9, without biasing or retaining means for its rod 9b allows to have a brewing chamber wherein, starting from the configuration shown in position A of FIG. 4, in which L2=0 and the movable base wall 8 is flush with the upper rim 3b of the brewing chamber 3, it is possible move said chamber, as close as possible to first piston 7, keeping said movable base wall 8 flush with the upper rim 3b of the chamber 3 to have the cake of spent coffee protrude from the chamber 3.

This is an important aspect relating to the discharging of the spent coffee cake 32. In fact the brewing chamber, during the discharging of spent coffee cake 32, is moved at a height greater than in prior brewing apparatuses and this allows to locate the opening of the container as high as possible; thus it is possible to have a bigger container and consequently an empting of it with minor frequency from a user, keeping a compact dimension of the brewing apparatus.

The invention claimed is:

1. A brewing apparatus (1) for preparation of a beverage by brewing an ingredient (32), that comprises:
a support frame (2),
a brewing chamber (3) having a wall (3a) to receive said ingredient (32), the brewing chamber (3) having a substantially vertical axis (A-A);
a first piston (7) and a second piston (9), said second piston (9) including a head (8) and a rod (9b), wherein said brewing chamber (3), said first piston (7) and said second piston (9) are movable with respect to said support frame (2);
a liquid inlet provided in one of said first piston (7) or said second piston (9), and a liquid outlet provided in either the first piston (7) or second piston (9) that is not provided with the liquid inlet, said second piston (9) being co-axially movable with said chamber (3) and within said chamber (3); and
a discharge device (21) for discharging the ingredient (32) after brewing,
wherein said discharge device (21) is pivotally movable around a pin (22) with respect to said brewing chamber (3) in a plane perpendicular to said axis (A-A), wherein said discharge device (21) for discharging the ingredient (32) after brewing is provided with: a central part (21b) that is mounted pivotally on said pin (22), said pin (22) being connected to said brewing chamber (3); a working portion (21a, 30, 31) to remove the ingredient (32) from the head (8) of the second piston (9); and a projecting portion (21c) that extends from said central part (21b) and that is housed in a guide (23), said guide (23) extending along said apparatus (1), parallel to the said axis (A-A) of the brewing chamber (3) and being fixed to the support frame (2), wherein a portion (23b) of said guide (23) has a double curved shape and is configured to provide a double rotation of the working portion (21b) around said pin (22), wherein said chamber (3) and said second piston (9) are movable along a path according to said axis (A-A) from a bottom position (Hmin) to a top position (Hmax), said path including a discharge position (Hdis) between the bottom position (Hmin) and the top position (Hmax) to discharge the ingredient (32) from said chamber (3) after brewing the ingredient, said positions (Hmin, Hmax and Hdis) having a height between an upper rim (3b) of said chamber (3) and a lower base (2a) of the support frame (2), wherein said chamber (3) and said rod (9b), when in said discharging position (Hdis), are both spaced from said bottom position (Hmin), wherein a length (L4) is the difference between the height at the discharge position (Hdis) and the height at the bottom position (Hmin), and wherein the length (L4) is greater than the height of the bottom position (Hmin).

2. A brewing apparatus (1) according to claim 1 wherein said rod (9b) of said second piston (9) is extending through said wall (3a) of the chamber (3) whereby a free end (9a) of the rod is located outside said brewing chamber (3) and is movable with said piston (9) and said chamber (3).

3. A brewing apparatus (1) according to claim 2, wherein said free end (9a) of said rod (9b) is not connected to a guide, a retainer, or springs.

4. A brewing apparatus (1) according to claim 2, wherein said second piston (9) and/or said rod (9b) are provided with seals to control their movement with respect to the wall (3a) of said brewing chamber (3).

5. A brewing apparatus (1) according to claim 1, wherein said length (L4) between said bottom position (Hmin) of said chamber (3) and said discharge position (Hdis) is at least 15% of a length (L1) between said bottom position (Hmin) and said top position (Hmax).

6. A brewing apparatus (1) according to claim 1, wherein said chamber (3) is movable along said axis (A-A) by a rotary screw (5) positioned parallel to said axis (A-A) of movement of said chamber (3), said rotary screw (5) being driven by a motor (6).

7. A brewing apparatus (1) according to claim 1, wherein said first piston (7) is movable co-axially to said chamber (3) and to said second piston (9) by a length (L3).

8. A brewing apparatus (1) according to claim 6, wherein said brewing chamber (3) is mounted on said rotary screw (5) and is reciprocated along said axis (A-A) by rotation of a spindle, and wherein said rotary screw (5) is the only element of said brewing apparatus (1) that is operated by said motor.

9. A brewing apparatus (1) according to claim 1, wherein said first piston (7) has said liquid outlet and a valve (16-20) located on said liquid outlet to selectively connect said liquid outlet to a beverage dispensing spout (14*b*) or to said beverage dispensing spout (14*b*) and to the ambient air, wherein said liquid outlet includes a dispensing spout (14) and a venting duct (14*c*, 17) connected together, and wherein said valve is located on said venting duct.

10. A brewing apparatus (1) according to claim 9, wherein said first piston (7) comprises seals (13, 20) to control the movement of said first piston (7) with respect to said brewing chamber (3) and said apparatus (1).

11. A brewing apparatus (1) according to claim 6, further comprising a hopper (25) to feed ground material to said brewing chamber (3), wherein said hopper (25) has a lower edge (28) and is mounted on said brewing apparatus (1) at a mounting position (27) that is located above the said first piston (7), and wherein said hopper (25) is pivotally movable between a resting position and a feeding position.

12. A brewing apparatus (1) according to claim 11, wherein the lower edge (28) of said hopper (25), when said hopper (25) is in the resting position, is positioned on the path to be followed by said brewing chamber (3) or by said discharge device (21) for the ingredient; wherein said lower edge (28) has a cam surface (29) which is angled and shaped so as to move said hopper (25) away from the said first piston (7) when said lower edge (28) is contacted by a cam surface (30) of said brewing chamber (3) or of said discharge device (21) for the ingredient (32).

13. A beverage dispensing machine that comprises a brewing apparatus (1) according to claim 1.

14. A brewing apparatus (1) according to claim 1, wherein the ingredient (32) is discharged from said brewing chamber (3) in a direction perpendicular to the vertical axis (A-A) based on said chamber (3) and said rod (9*b*) being in said discharge position (Hdis).

* * * * *